Figure 6:
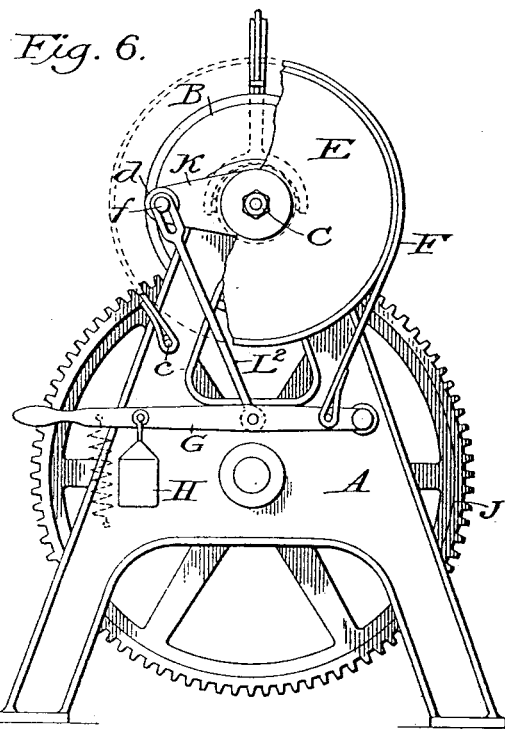

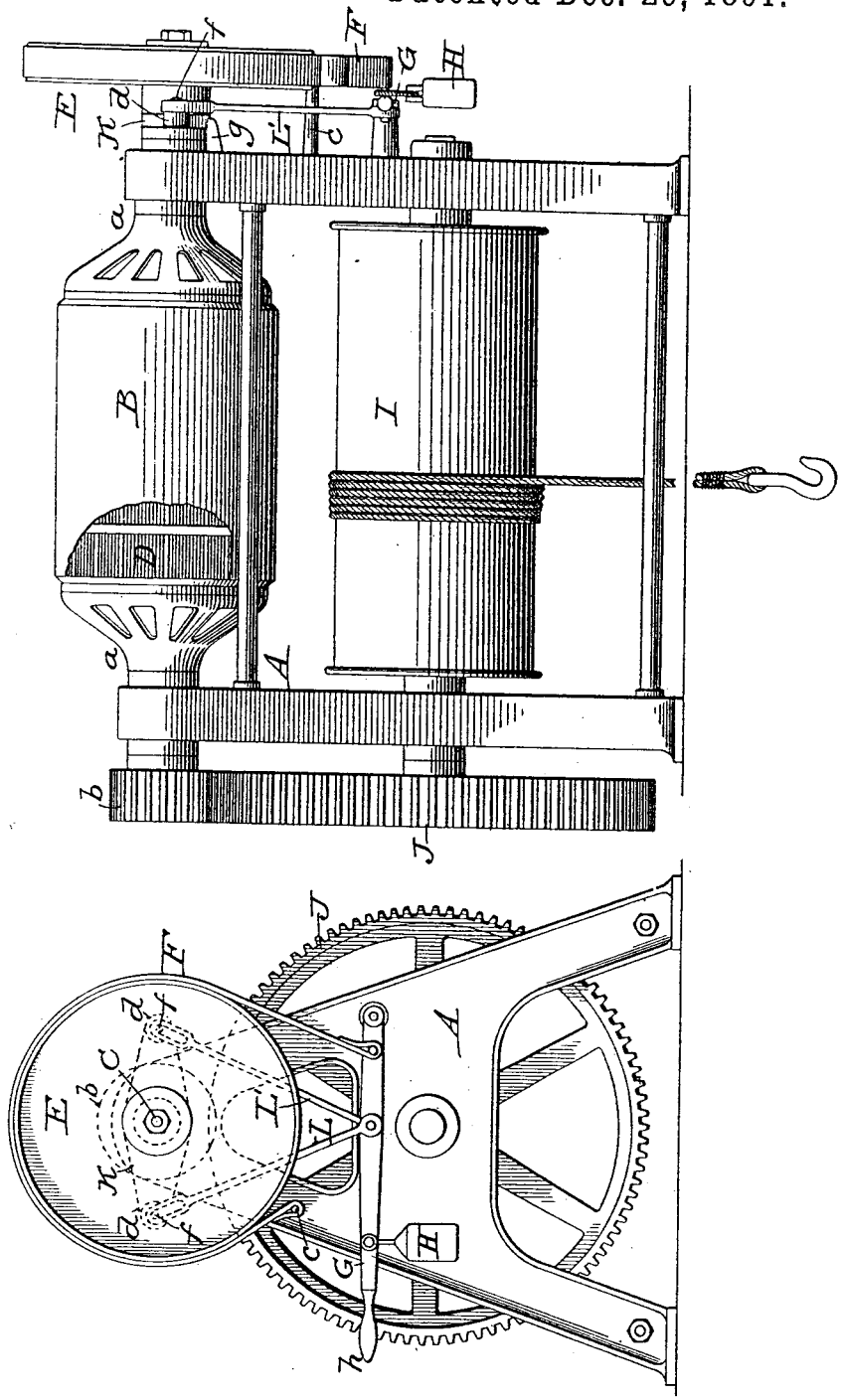

(No Model.) 3 Sheets—Sheet 2.
A. J. SHAW.
BRAKE FOR ELECTRIC MOTORS.
No. 465,999. Patented Dec. 29, 1891.
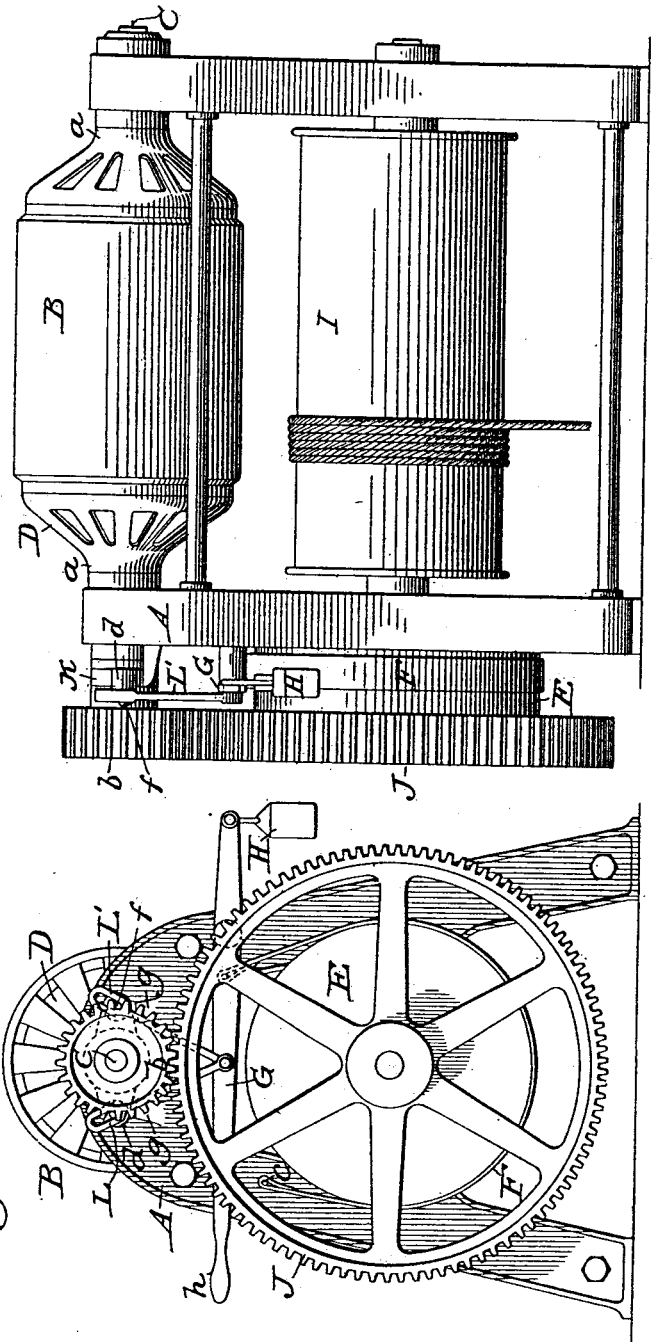
Witness:
James F. Duhamel.
Horace A. Dodge.
ALTON J. SHAW,
Inventor,
by Dodge & Sons,
Attys (No Model.) 3 Sheets—Sheet 3.
A. J. SHAW.
BRAKE FOR ELECTRIC MOTORS.

No. 465,999. Patented Dec. 29, 1891.

Witness:
James F. Duhamel
Horace A. Dodge.

ALTON J. SHAW, Inventor,
by Dodge & Son,
his Attys

UNITED STATES PATENT OFFICE.

ALTON J. SHAW, OF MUSKEGON, MICHIGAN.

BRAKE FOR ELECTRIC MOTORS.

SPECIFICATION forming part of Letters Patent No. 465,999, dated December 29, 1891.

Application filed September 21, 1891. Serial No. 406,387. (No model.)

*To all whom it may concern:*

Be it known that I, ALTON J. SHAW, a citizen of the United States, residing at Muskegon, in the county of Muskegon and State of Michigan, have invented certain new and useful Improvements in Brakes for Electric Motors, of which the following is a specification.

My invention relates to automatic brakes for use in connection with machinery driven by electric motors, and depends for its operation on the reaction or the pull of the armature against the field-magnets when a working current is sent through the motor-circuit and the cessation of such reaction when the circuit is opened and the current ceases. The brake, which may be of any convenient or approved form, is normally applied or held in action by a weight, spring, or other suitable device; but when the operating-circuit is closed and a current passes through the motor the fields oscillate slightly on account of the reaction of the armature against them, and through suitable connections release or withdraw the brake. This renders the operation of hoisting machinery, to which the brake is particularly applicable, perfectly safe, as regards any danger of dropping the load on account of failure of the actuating-current, as the brake is always in action when no current is passing, is withdrawn from action only by the passing of a current sufficient to sustain the load, and is immediately and automatically applied whenever such current ceases. The brake may, however, be so arranged as to be operated manually as well as automatically, if desired, and is so shown on the drawings. It is well adapted, also, for operating the brakes on electrically-propelled vehicles or carriages, especially such as it is desired to control without the presence of an operator on the carriage or vehicle itself.

In the accompanying drawings, Figure 1 is an end elevation of a hoist provided with my improvement; Fig. 2, a side elevation of the same; Fig. 3, a sectional view of the armature-shaft and of a sleeve or neck which supports the field-magnets at one end, together with the parts carried thereby; Fig. 4, an end elevation showing a modified arrangement of parts; Fig. 5, a side elevation of the same, and Figs. 6 and 7 views illustrating a modification in which the brake is applied only when the motor runs in one direction.

In hoisting apparatus it is of great importance to prevent the sudden dropping of the load even a very short distance, not only on account of the great and dangerous strains which the sudden checking of the descent of the load imposes upon the machinery and hoisting chains or cables, but on account of the serious damage which would in many cases ensue if the load descended even a very short distance farther than was intended. To reduce to its lowest limits the possibility of such a contingency, it is desirable to make the brakes controlling the movements of hoisting machinery automatic in their action, so that their application is instantaneously consequent upon the withdrawal of the actuating energy, or in electrically-operated machinery upon the opening of the circuit.

It is very evident that the torsional pull or torque on the armature of an electric motor postulates a pull of equal intensity, but opposite in direction, upon the fields, as action and reaction are necessarily equal and opposite. Thus the power at command for the disengaging of the brake is equal in amount to that which tends to rotate the armature. If the working circuit is interrupted, and the pull upon the armature ceases simultaneously the reaction of the armature against the field ceases. The fields which have been partially rotated by this reaction are drawn back to their normal position by the action of the spring or gravity, thus permitting the brake to act.

I do not broadly claim in the present specification a brake held out of action by the passage of the current through the working circuit, but a novel construction and arrangement of parts, already described in general terms and hereinafter specifically set forth, by which such result is obtained.

In the drawings I have represented my invention as applied to an alternating-current motor; but obviously it is equally applicable to continuous-current machines and with various modes of winding.

In the drawings, A indicates a strong frame in which is journaled a hollow cylindrical shell B, constituting the field-magnets of the machine. Passing axially through the sleeves a of the shell B is a shaft or arbor C of the armature D of the motor, which in the form represented in Figs. 1, 2, and 3 carries upon one end a pinion b and upon the other end a band-wheel E, to which wheel is applied a brake band or strap F, one end of which band is attached to a post or support c, projecting from the main frame A, and the other end of which is connected with a lever G of the second order, as shown in Fig. 1. To the free or power end of the lever is hung a weight H, which exerts a constant tendency to apply the band F to the wheel E, and thus prevent the rotation of the armature-shaft C. Motion is transmitted to a winding or hoisting drum I from the pinion b on the armature-shaft through the medium of a gear-wheel J, keyed or otherwise made fast upon the shaft of said drum.

K represents a cross bar or rocker keyed to the sleeve a of the field-magnet B and having radially-projecting arms d, each provided at or near its outer end with a stud or pin f.

Suitably pivoted or jointed to the lever G at a point between its fulcrum and the weight H are two draw-rods L and L', each of which is slotted at its upper end to straddle one of the pins f, the slotted ends being applied to the respective pins, as shown in Fig. 1.

Fig. 1 represents the position of the parts when the motor is at rest or out of action, the rocker or cross-bar K at such time occupying a horizontal position, so that neither pin exerts any tendency to lift the draw-rod connected therewith and release the brake. If now current be supplied to the motor, the armature tends to rotate, and, reacting upon the fields, tends to rotate them in the opposite direction. The armature is not free to rotate, being held by the brake; but the fields, being free to move, rotate backward a short distance, (the term "backward" being used in this specification to indicate a direction of movement opposite to that of the armature,) thus causing the rocker or cross-bar K to swing or oscillate and lift the lever H through one or the other of the draw-rods L or L', according to the direction in which the armature tends to rotate, thereby releasing the brake-band F and freeing the brake-drum E, which leaves the motor free to run and exert its full power on the hoisting-drum. If now the current be suddenly interrupted and the armature and field-magnets in consequence deenergized, the reaction between them ceases and the weight H immediately draws down the lever G, and through the rod L or L', which last lifted it, restores the rocker or cross-bar K to its horizontal position and applies the brake-band firmly to the band-wheel E, thus bringing the machinery at once to a stop. If the motion be in the reverse direction, the other of the draw-rods L or L' will act in a precisely similar manner and take off the brake; but in the event of the current being interrupted from any cause said draw-rods will immediately restore the parts to the position indicated in Fig. 1 and reapply the brakes.

It is obvious that the form of the brake may be considerably modified or varied, and that the manner of mounting the field-magnets may likewise be modified to a very considerable extent, the only essential requirement being that there shall be permitted a limited movement of the field magnet or magnets in consequence of the attraction existing between the same and the armature. This motion may be limited either through the brake connections themselves or by special stops.

In Figs. 1 and 2 I have shown stop-lugs g, cast upon or secured to the frame A to limit the play of the rocker-frame or cross-bar K, which construction is at the same time simple and effective.

As shown in the several figures, the lever G is provided with a handle or grip h, to enable it to be actuated by hand to remove the brake or to supplement the force exerted by the weight H.

The manual operation of the brake-lever is convenient in case it is desired to lower the load without operating the motor.

The slotting of the arms L and L' is necessary in order to provide for the alternate action of the draw-rods, though the same result may, obviously, be secured by slotting the arms of the rocker K or slotting the lever G and using a pin or pins carried by the lever G and extending into the slot or slots; or any equivalent connection which will afford a slight play may be adopted.

In Fig. 4 I have represented the invention as applied in connection with a similar motor or hoist, but with a lever of the first instead of the second order, the designation of the class of lever in both cases having reference to the position of the power or weight which automatically applies the brake when the current is interrupted and not to the point of application of the power for holding the brake off or out of action.

In Figs. 4 and 5 the same letters represent the several parts referred to in connection with Figs. 1, 2, and 3; but in this form the links L and L' and the brake-band are connected to the lever G at points between the hand-hold h and the fulcrum, while the weight H is applied to the end of the lever opposite that upon which the hand-hold is formed. As a consequence of this rearrangement the rocker of the cross arm or bar K acts through the levers L and L' to depress or force down the lever G, and thereby to slacken or free the band F from the band-wheel E, which is in this instance applied to the arbor of the hoisting-drum I, instead of being applied directly to the armature shaft or arbor. The principle of operation, however, remains the same, as does also the result, the rods L and L' merely becoming thrust-rods instead of draw-rods.

Figure 7:
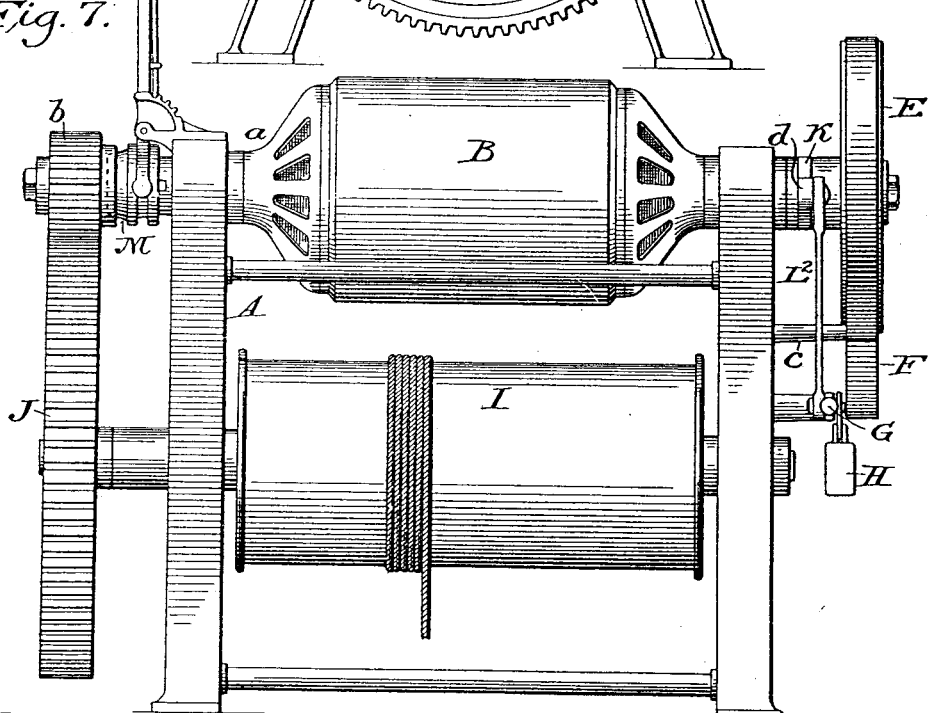

The construction above set forth is designed to withdraw the brake, whether the motor rotates in one or the other direction; but it is apparent that a single rod may be used, provided other means—as, for instance, a clutch—be used to permit the lowering of the load without reversing the motor. Such a construction is illustrated in Figs. 6 and 7, the operation of the link L² being precisely the same as that of link L of Fig. 1. The clutch M permits the lowering of the load when desired. So, too, a spring may be substituted for the weight H, or the lever G may itself be made sufficiently heavy at its power end to render a separate weight superfluous.

Various other modifications or rearrangements of the working parts thus described will readily suggest themselves to the practical mechanic and need not, therefore, be further elaborated herein.

It is common at the present time to construct electric motors in two ways—one with a rotary armature and fixed field-magnets and the other with rotary field-magnets and a fixed armature.

Manifestly the present invention is equally applicable to the two plans of construction, the connections in each case being made with that part which is relatively fixed—that is to say, which has only the limited play necessary to the actuation of the brake mechanism.

As this invention is in no manner concerned with the construction of the motor, *per se*, beyond the provision for the limited movement noted, and as motors of both types are well-known, it is unnecessary to illustrate or further describe such reversed arrangement.

Having thus described my invention, what I claim is—

1. In combination with an electric motor having a field magnet or magnets and an armature, one adapted and arranged to rotate and the other free to move or oscillate a limited distance, and a brake connected with and controlled by the part having a limited play or movement.

2. In combination with the rotary armature of an electric motor, a field magnet or magnets adapted to rotate or oscillate through a limited arc about the axis of rotation of said armature, and a brake operated by the rotation or oscillation of said field magnet or magnets.

3. In combination with the rotary armature of an electric motor, a field magnet or magnets adapted to rotate or oscillate a limited distance in both directions about the axis of said armature, a brake, and intermediate connections between the field magnet or magnets and the brake, whereby the brake is released by the movement of said field magnet or magnets.

4. In combination with the rotary member of an electric motor, a coacting member adapted to move or oscillate a limited distance about the axis of rotation of said field, a brake and intermediate connections between the oscillatory member and the brake, whereby the brake is released by the movement of the oscillatory member.

5. In combination with the rotary armature of an electric motor, a field magnet or magnets adapted to rotate or oscillate through a limited arc about the axis of rotation of said armature, and a brake normally in action, the release of which is effected by and consequent upon the reaction of the armature on the movable field-magnet when a current is passed through the working circuit.

6. In combination with a rotatable armature and with a field-magnet capable of limited movement about the axis of rotation of said armature, a brake-drum driven by said armature, a brake normally bearing against said brake-drum, a pressure device connected with said brake for normally applying the brake to the drum, and a connection between said brake and the movable field-magnet, whereby the movement of said field-magnet is caused to release the brake, substantially as described.

7. In combination with the rotary member of an electric motor and with a coacting member capable only of limited movement about the axis of rotation of the rotary member, a brake-drum driven by rotary member, a brake normally bearing against said brake-drum, a pressure device connected with said brake for normally applying the brake to the drum, and a connection between said brake and the member, having limited play, whereby the movement of the latter is caused to release the brake, substantially as described.

8. In combination with a rotatable armature and with a field magnet or magnets capable of a limited movement about the axis of rotation of said armature, a brake-drum driven by said armature, a brake, a pressure device connected to said brake for applying it to said drum, and a connection or connections between said brake and the movable field magnet or magnets, whereby the movement of said field magnet or magnets due to the reaction of the armature on the same when a current is passed through the working circuit is caused to release said brake.

9. In combination with a rotatable armature and with a field-magnet capable of limited movement about the axis of rotation of said armature, a hoisting-drum driven by said armature, a brake-wheel, a brake bearing on said brake-wheel, a lever connected with said brake and provided with a weight or equivalent device for normally applying said brake to the brake-wheel, and a connection between the lever and the movable field-magnet, whereby the movement of the field-magnet is caused to slacken the pressure of the brake.

10. In combination with the rotary member of an electric motor, a coacting member capable of a limited movement about the axis of rotation of the rotary member, a hoisting-drum driven by said rotary member, a brake-wheel, a brake bearing on said wheel, a lever connected with said brake or brake-band and provided with a pressure device for normally applying said brake to the brake-wheel, and a connection between the lever and the member having limited play, whereby the movement of the latter is caused to slacken the pressure of the brake.

In witness whereof I hereunto set my hand in the presence of two witnesses.

ALTON J. SHAW.

Witnesses:
   C. J. SAWYER,
   OTTO ALBERT.